Aug. 4, 1936.  F. T. DE LONG  2,049,425
BRAKE BEAM STRUCTURE
Filed Dec. 14, 1931.  2 Sheets-Sheet 1
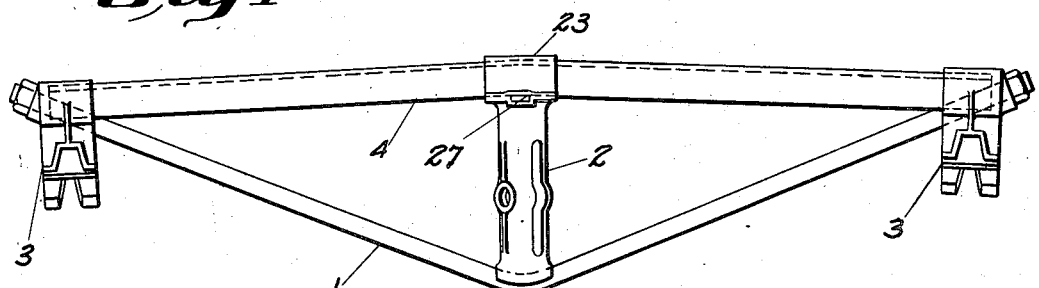
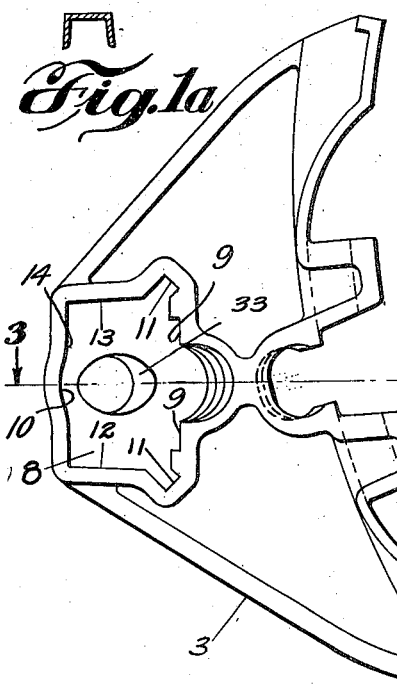
Inventor
Frederic T. DeLong
By Rodney Bedell
Attorney Aug. 4, 1936.          F. T. DE LONG                2,049,425
                    BRAKE BEAM STRUCTURE
                    Filed Dec. 14, 1931           2 Sheets-Sheet 2
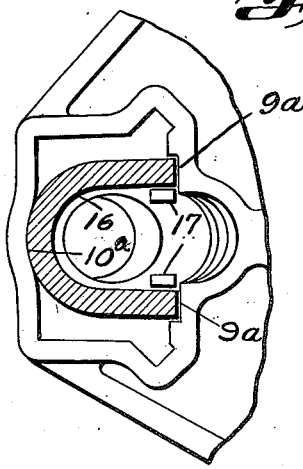
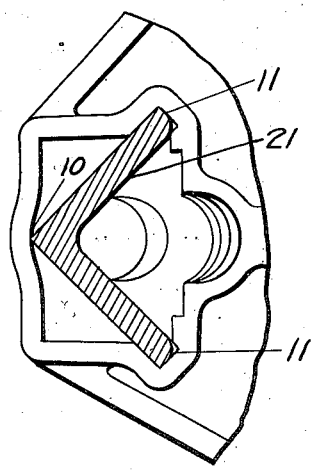
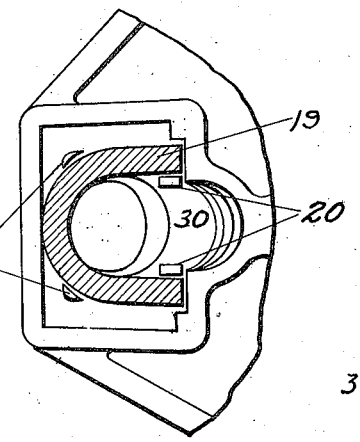
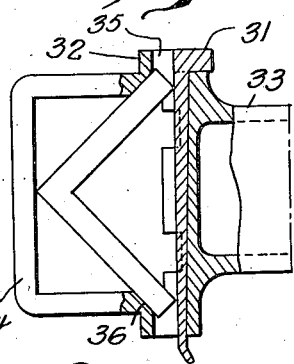
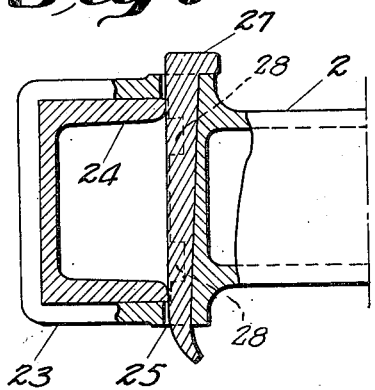
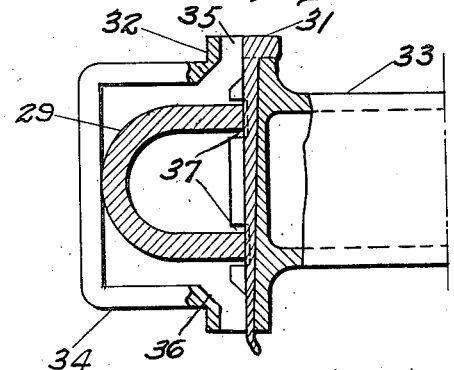
Inventor
Frederic T. DeLong
By Rodney Bedell
Attorney Patented Aug. 4, 1936

2,049,425

UNITED STATES PATENT OFFICE 2,049,425

BRAKE BEAM STRUCTURE

Frederic T. De Long, Chicago, Ill., assignor to Chicago Railway Equipment Company, Chicago, Ill., a corporation of Illinois Application December 14, 1931, Serial No. 580,761

17 Claims. (Cl. 188—223)

This invention relates to brake beams and particularly to the truss type beams applied to railway cars.

There have been made, for many years, brake beams with various types of compression members, such as channels, U sections, angle sections, pipe sections, etc., which have entailed the carrying of a great deal of stock for making repairs due to the fact that one type of heads and struts, the parts of the brake beam which wear out most rapidly, cannot be used with more than one type of compression member. There has been considerable agitation for the standardizing of brake beams mainly in order that one type of strut and one type of brake head could be carried in stock for making repairs to all brake beams. This would make for prompt movement of cars in repair shops and avoid the necessity of carrying a large stock of repair parts or holding cars out of service pending the receipt of certain specific types of brake heads and struts to repair the brake beams which have been so badly worn as to prevent their safe movement.

The American Railway Association members, through their various committees, have given this matter of interchangeability a great deal of attention and thought, and the conclusion has been expressed that the only solution to the problem lay in the adoption of a brake beam which has one specific type of compression member—such as one of channel shape. However, as there are millions of brake beams now in service of sections other than channel shape, the adoption at this time of a channel shaped brake beam as standard would be a very expensive matter to the railroads and for this reason, the adoption of a standard type of brake beam has been delayed.

The present invention has for its main object the provision of a brake beam assembly including brake head and strut members which may be used in connection with various different types of compression members now most common.

A more specific object is to provide brake head and strut members arranged to be assembled with truss type brake beams having compression members of channel, U, or angle section.

These and other detailed objects are attained by the structure illustrated in the accompanying drawings, in which—

Figure 1 is a view of a truss brake beam assembly.

Figure 1a is a section through the beam compression members.

Figures 1b and 1c are similar sections illustrating other forms of compression members.

Figure 2 is a side view of one form of the brake head.

Figure 3 is a transverse section taken on line 3—3 of Figure 2.

Figures 4 to 6, inclusive, are detail side views of brake heads applied, respectively, to the beam compression members shown in Figures 1a, 1b and 1c, the head in Figure 5 being slightly modified.

Figure 7 is a similar detail view illustrating another modification of the head.

Figure 8 is a view of a strut assembled with a channel section beam as shown in Figure 1a.

Figures 9 and 10 are detail views of a modified strut assembled, respectively, with the compression members shown in Figures 1b and 1c, the strut and portions of the compression members being sectioned for clearer illustration.

In Figure 1 of the drawings, a truss type brake beam is shown having a tension member 1, a strut 2, and heads 3 disposed transversely to compression member 4 which may be of U, channel or angle section, as illustrated by sections 1a, 1b and 1c. A bracket 23 at the rear end of the strut embraces the compression member and is locked thereto by a key 27.

In Figures 2 and 3, the head 3, shown disassembled from the beam, has a generally rectangular recess 8, for receiving the converging tension and compression members of the beam, and a boss 33 for seating an adjustable tension member retaining element. The front and rear walls of recess 8 are provided with notches 9 and a recess 10, respectively, for accommodating a U-section compression member (see Figures 1b and 5). The front wall is also provided with angularly disposed slots or grooves 11 for accommodating an angle section compression member (see Figure 6). The top and bottom and rear walls 12, 13 and 14, respectively, of recess 8 are shaped to snugly receive the channel compression member 15 (see Figures 1a and 4).

In Figure 5, a compression member 16 of U-section is shown assembled with a slightly modified head. The curved rear wall of member 16 is seated in depression 10 and the legs of the member extend into notches 9a. Additional bosses or lugs 17 project from the outer side wall of the head adjacent the tension member opening, extend into notches 9a. Additional bosses or lugs 17 project from the outer side wall of the head adjacent the tension member opening (designated 33 in Figures 2 and 3) and cooperate with notches 9a and recess 10a in maintaining the head and compression member against relative rotation.

In the head illustrated in Figure 7, the depression in the rear wall of the head recess is omitted, as are the angular grooves in the front wall, and lugs 18, projecting from the side wall 30 of the recess, cooperate with lugs 20, corresponding to lugs 17 in Figure 5, to hold the head properly in position.

In Figure 6, an angle section compression member 21 is shown assembled with the head illustrated in Figures 2 and 3. Angularly disposed grooves 11 receive the legs of the compression member and the rear portion of the angle is shown engaging depression 10. The grooves 11 are adequate to properly maintain the assembly.

It will be seen that the various recesses and lugs provided to accommodate each type of compression member do not interfere with the assembling with the head of the beam tension member or other types of compression members. For instance, in Figure 7 the lugs 18 and 20, which assist in maintaining the U-section member in position, would not interfere with the mounting of a channel compression member, and the lugs 17 in Figure 5 would not affect the mounting of either a channel or angle section beam. Nor do the angularly disposed slots 11 in Figures 2 to 6 interfere with the proper mounting of the channel or U-section compression members. The angular slots are omitted in Figure 7, this form being intended for use with channel or U section compression members.

As illustrated in Figure 8, bracket 23 at the rear end of strut or fulcrum arm 2 is arranged for mounting beam compression members of either channel or U-section. The bracket has a vertical opening 25 for receiving the strut locking key 27. The inner contour of the bracket is rectangular and shaped to snugly receive the channel compression member 24. Notches 28 are provided to receive the legs of a U-shaped member.

In Figure 9, a U-shaped compression member 29 is shown assembled with the beam engaging bracket 34 of strut or fulcrum arm 33. Notches 37 on each side of the key opening 35 and corresponding with notches 28 in Figure 8 receive the ends of the legs of the compression member. The legs of the U-shaped member are longer than those of the channel member 24, necessitating the use of a key 31 which is thinner than that used with the channel compression member. The bracket 34 is also provided with enlargements 32 at the top and bottom and angularly disposed grooves 36 in the upper and lower front corners for accommodating an angle compression member. Figure 10 shows an angle section compression member 38 assembled with the modified strut bracket. Key opening 35 is large enough to receive keys of various sizes as determined by the thickness of the compression member used.

Each of the head and strut devices shown is arranged to properly mount at least two different brake beam compression members of the types and proportions now most generally used. However, the contour of the beam receiving portion of each transverse device, that is, the head recess and strut bracket, might be otherwise varied within the broadest phase of the invention to accommodate still other types of beams than those shown and having head and fulcrum arm attaching parts varying in external shape, width, thickness, or length. Also the various forms illustrated might be modified as to various other details without departing from the spirit of the invention and exclusive use of all such modifications as come within the scope of the appended claims is contemplated.

I claim:

1. In a truss type brake beam assembly, a compression member and a transversely disposed device snugly mounted thereon, said device being arranged to receive other compression members having cross sections differing in shape and over all dimensions from said first-mentioned member, said device having fixed elements disposed to engage any of the referred to compression members to snugly maintain said device in proper relative position thereon.

2. A transverse device for a railway brake beam, having a recess arranged to selectively receive brake beam compression members of different shapes of cross section, there being a projection on the side of said recess positioned to engage a compression member of a certain shape to hold the device against rotation thereon, and there being elements at the sides of said projection for accommodating parts of a compression member of another shape.

3. A transverse device for a railway brake beam having a generally rectangular opening for attachment to a compression member of channel cross section, a side of said opening being recessed to adapt said opening to accommodate a compression member of greater width of cross section than said first mentioned compression member.

4. A railway brake beam device having a recessed shaped to selectively mount corresponding parts of different types of brake beams, said recess being of general size and shape to mount a beam part of channel section, the front wall of said recess having angularly disposed slots and notches disposed to receive the forward ends of the legs of a beam part of angle-iron section and another beam part of U-section, respectively, and to selectively maintain either of said latter parts in proper relative position.

5. A railway brake beam device having a recess shaped to selectively mount corresponding parts of different types of brake beams, said recess being of general size and shape to mount a beam part of channel section, there being a depression in the rear wall of said recess and notches in the front wall thereof disposed to receive the rear portion and the forward portion, respectively, of a beam part of U-section and to maintain the device in proper relative position thereon.

6. A railway brake beam device having a recess shaped to selectively mount corresponding parts of different types of brake beams, said recess being of general size and shape to mount a beam part of channel section, there being angularly disposed slots in the upper and lower front corners of said recess disposed to receive the forward ends of the legs of a beam part of angle-section and to maintain the device in proper relative position.

7. A railway brake beam device having a recess shaped to selectively mount corresponding parts of different types of brake beams, said recess being of general size and shape to mount a beam part of channel section, there being a depression in the rear wall of said recess and notches in the forward wall thereof positioned to receive the rear portion and forward portions, respectively, of a U-section beam part, and there being angularly disposed slots also in said forward wall for receiving the forward portions of an angle-section beam part, said depression, notches and slot being disposed to maintain the corresponding beam parts in proper relative position.

8. In a railway brake beam device having a generally rectangular recess for receiving the compression member of a truss type brake beam, projections in the rear portion of said recess and elements in the front portion thereof disposed to engage the rear and front portions, respectively, of the beam compression member to maintain said member in proper relative position.

9. In a truss type brake beam, a compression member and a strut, said strut including a bracket arranged to selectively receive compression members of different widths and different shapes of cross section, there being a recess in the forward portion of said bracket, and a key in said recess and engaging the legs of said member to lock the same in proper position in said bracket.

10. A strut for a truss type brake beam having a bracket at one end arranged to selectively receive beam compression members of different shapes of cross section, said bracket being of a size and shape to mount a channel compression member, and having elements disposed to engage the legs of a compression member of different shape to maintain the strut and said latter-mentioned compression member in proper relative position.

11. A railway brake head with a recess shaped to mount brake beam members of different widths and dissimilar shapes of cross section, and having elements disposed to selectively cooperate with the extremities of each of said beam members to maintain said head in proper position relative thereto.

12. A fulcrum member for a brake beam including a bracket for attachment to a beam part, a wall of said bracket being shaped to snugly receive the legs of a certain type of beam part and being recessed to accommodate the legs of a corresponding beam part which is wider than said first-mentioned beam part.

13. A fulcrum member for a brake beam including a bracket shaped to snugly receive a beam part of a certain shape, a wall of said bracket being recessed to selectively receive the legs of a corresponding beam part of greater width than said first-mentioned beam part, and an element for engaging the legs of the selected beam part to snugly maintain the assembly.

14. In a railway brake head having a recess for receiving the head attaching portion of a brake beam, structure on the walls of said recess for selectively snugly receiving different brake beams, the head attaching portions of which vary substantially in over all dimensions.

15. A railway brake assembly including a brake beam, a brake head having a recess snugly receiving the head attaching portions of said beam, and structure on the walls of said recess for snugly accommodating a different beam having a head attaching part substantially varying in over-all dimensions from that of said first-mentioned beam.

16. In combination, a brake beam, strut and brake head members each having a recess snugly mounting parts of said brake beam, and structure in said recess for selectively mounting corresponding brake beam parts having head and strut engaging parts of different over-all dimensions and adapted to snugly maintain any of said parts in their proper relative positions.

17. In a railway brake beam transverse device having a recess arranged to snugly receive a part of certain brake beam, structure on the sides of said recess for engaging portions of other corresponding brake beam parts varying substantially in over-all dimensions of cross section from said first-mentioned part for holding the device against rotation on the selected beam.

FREDERIC T. DE LONG.